US010601454B1

(12) United States Patent
Luus et al.

(10) Patent No.: US 10,601,454 B1
(45) Date of Patent: Mar. 24, 2020

(54) SEPARATING TWO ADDITIVE SIGNAL SOURCES

(71) Applicant: International Business Machines Corporation, Armonk, NY (US)

(72) Inventors: Francois Pierre Luus, Wierdapark (ZA); Etienne Eben Vos, Johannesburg (ZA); Komminist Weldemariam, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/206,038

(22) Filed: Nov. 30, 2018

(51) Int. Cl.
*H04B 1/10* (2006.01)
*G06N 20/00* (2019.01)

(52) U.S. Cl.
CPC .......... *H04B 1/1027* (2013.01); *G06N 20/00* (2019.01)

(58) Field of Classification Search
None
See application file for complete search history.

(56) References Cited

U.S. PATENT DOCUMENTS

| 5,774,787 A * | 6/1998 | Leopold | H04B 7/18513 455/12.1 |
| 8,483,621 B2 | 7/2013 | Srreerama et al. | |
| 8,494,464 B1 * | 7/2013 | Kadambe | H04K 3/45 342/14 |
| 8,565,294 B2 | 10/2013 | Szajnowski | |
| 10,332,001 B2 * | 6/2019 | Rippel | G06K 9/6232 |
| 2008/0045175 A1 | 2/2008 | Yoon et al. | |
| 2009/0325530 A1 | 12/2009 | Srreerama | |
| 2017/0083792 A1 | 3/2017 | Rodriguez-Serrano et al. | |
| 2017/0109649 A1 * | 4/2017 | Baughman | G06N 20/00 |
| 2017/0132290 A1 * | 5/2017 | Koch | G06F 16/5854 |
| 2018/0349527 A1 * | 12/2018 | Li | G06N 3/0445 |
| 2019/0026609 A1 * | 1/2019 | Shen | G06K 9/6269 |
| 2019/0102694 A1 * | 4/2019 | Yates | G06N 20/00 |

FOREIGN PATENT DOCUMENTS

| EP | 0576100 A1 | 12/1993 | |
| EP | 1862810 A1 * | 12/2007 | G01S 3/023 |

OTHER PUBLICATIONS

Schlegl, T., et al., "Unsupervised anomaly detection with generative adversarial networks to guide marker discovery", To be published in International Conference on Information Processing in Medical Imaging, https://arxiv.org/abs/1703.05921, Mar. 17, 2017, 12 pages.

(Continued)

*Primary Examiner* — Lana N Le
(74) *Attorney, Agent, or Firm* — Scully, Scott, Murphy & Presser, P.C.; Eyal Gilboa

(57) ABSTRACT

A first set of signal data is received. Generative machine learning models are trained based on the first set of signal data. The generative machine learning models include at least a first model trained to identify a first signal component and a second model trained to identify a second signal component. An incoming mixed signal data stream is dynamically separated into a clean signal component and a noise signal component by running the generative machine learning models.

20 Claims, 14 Drawing Sheets

(56) References Cited

OTHER PUBLICATIONS

Offringa, A., et al., "The SumThreshold method: technical details", http://www.astro.rug.nl/~offringa/SumThreshold.pdf, Jun. 11, 2012, Accessed on Nov. 30, 2018, 9 pages.

Offringa, A.R., et al., "A morphological algorithm for improving radio-frequency interference detection", Astronomy & Astrophysics, Received Nov. 22, 2011, Accepted Jan. 11, 2012, pp. 1-10, 539, A95.

O'Shea, T.J., et al., "Recurrent Neural Radio Anomaly Detection", https://arxiv.org/abs/1611.00301, Nov. 1, 2016, Accessed on Nov. 30, 2018, 7 pages.

Czech, D., et al., "A CNN and LSTM-based approach to classifying transient radio frequency interference", https://arxiv.org/pdf/1803.02684.pdf, Mar. 7, 2018, Accessed on Nov. 30, 2018, 5 pages.

Wang, J., et al., "Stacked Conditional Generative Adversarial Networks for Jointly Learning Shadow Detection and Shadow Removal", https://arxiv.org/pdf/1712.02478.pdf, Dec. 7, 2017, Accessed on Nov. 30, 2018, 10 pages.

Seemangal, R., "Watch SpaceX Launch the First of Its Global Internet Satellites", https://www.wired.com/story/watch-spacex-launch-the-first-of-its-global-internet-satellites/, Feb. 18, 2018, 2 pages.

\* cited by examiner

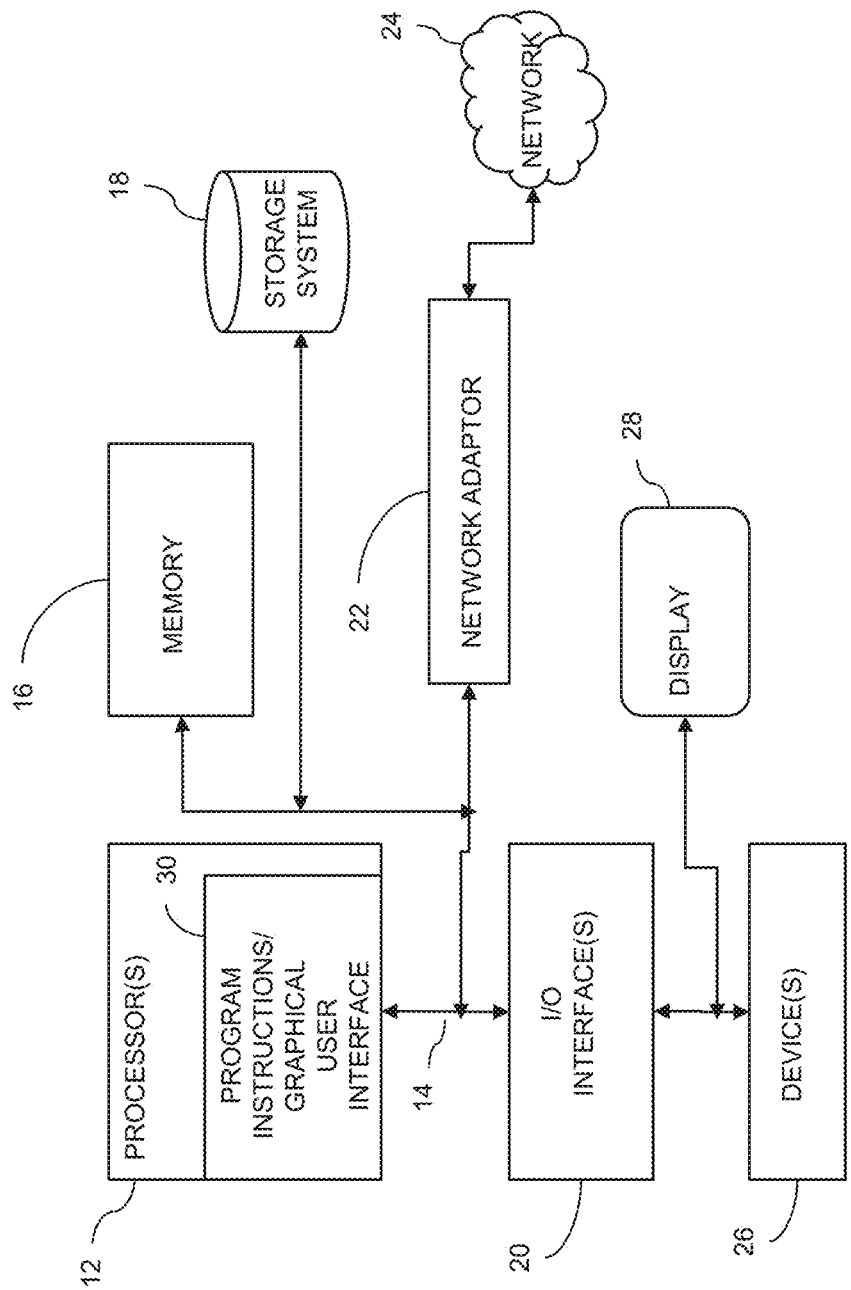

SEPARATING TWO ADDITIVE SIGNAL SOURCES

BACKGROUND

The present application relates generally to processing of signals such as radio frequency signals, and more particularly to a device and method of separating additive signal sources and detecting signal noise, wanted or unwanted signals.

When taking signal measurements in uncontrolled settings, the signal of interest is usually corrupted with unwanted noise or interference from an external unwanted source and/or from an internal source of noise caused by the measuring instrument itself. In general, the noise-component is assumed to be additive to the signal component, resulting in a measurement of mixed signals. However, it becomes challenging when the goal is to study only one component, for example, the underlying signal of interest. For example, in radio-frequency transmissions there are many possible sources of noise that are present, and a cooperative transmitter will need to accurately differentiate the signal of interest from all the noises. One way is to raise the transmission power significantly above the noise floor, but such mechanism is costly and there may be prohibiting rules preventing such mechanism.

Various methods exist for separating signals and noise. Radio frequency interference (RFI), for example, is a central topic where the goal revolves around detection and removal of noise from wanted signal. In radio astronomy signal analysis, the sum-threshold method is used on spectrograms to mask noise, and morphological operations may be used to enhance the masking result.

In the field of radio astronomy, for instance, radio telescopes are very sensitive to RFI which, if picked up, severely affects the astronomical signal of interest. While deep learning techniques like Convolutional Neural Networks (CNNs) and Long Short-term Memories (LSTMs) can be applied for the purpose of classifying sources of transient RFI, in order to successfully classify RFI in a real-world setting, accurate RFI detection first needs to be performed.

BRIEF SUMMARY

A computer-implemented method and system of separating additive signals with mixed measurements are provided. The method, in one aspect, may include receiving a first set of signal data. The method may also include training generative machine learning models based on the first set of signal data, the generative machine learning models comprising at least a first model trained to identify a first signal component and a second model trained to identify a second signal component. The method may further include dynamically separating an incoming mixed signal data stream into a clean signal component and a noise signal component by running the generative machine learning models.

A system of separating additive signals with mixed measurements, in one aspect, may include at least one hardware processor coupled with a memory device. The at least one hardware processor may be operable to receive a first set of signal data. The at least one hardware processor may be further operable to train generative machine learning models based on the first set of signal data. The generative machine learning models may include a first model trained to identify a first signal component and a second model trained to identify a second signal component. The at least one hardware processor may be further operable to dynamically separate an incoming mixed signal data stream into a clean signal component and a noise signal component by running the generative machine learning models.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 14 illustrates a schematic of an example computer or processing system that may implement a system according to one embodiment.

DETAILED DESCRIPTION

A method, system and techniques are disclosed, which dynamically analyze and separate two additive signals with mixed measurements (e.g., in radio astronomy). In one aspect, a first set of signal data may be received. For example, the first set of signal data may include stream of time-frequency measurements data from one or more radio telescope dishes or such historical data, for example, stored on a storage device. Custom generative machine learning models may be trained based on the first set of signal data. The trained models may dynamically separate incoming mixed signal data stream into a clean signal and a noise signal components. In another aspect, a method, system and techniques of optimizing and refining the models based on user specified inputs such as training metrics and performance, via a graphical user interface (GUI), are also disclosed.

In one aspect, one or more generative machine learning models are implemented, which can separate signal measurements from one or more additive noise components, such as signals in radio astronomy where astronomical signals are mixed with radio-frequency interference (RFI). In this approach, in one embodiment, realistic source-specific signals (e.g., the clean signal of interest component or the unwanted noise component) are distinguished from unrealistic ones. Given an input example having two additive source components (clean signal and noise), a method of the present disclosure in one embodiment attempts to find the most realistic source-specific components that are closest to each of the corresponding ground-truth. The method then subsequently computes the residual of each of these recovered components with respect to the input signal, the residual representing an estimate of the second source-component (e.g., signal or noise). The method continually refines these estimates further, thereby producing a separation of the two source components given their additive mixture as input.

In one embodiment, a method may include training generative adversarial networks (GANs), for example, one for the signal component and one for the noise component, based on historical measurements data where the noise components are flagged. GANs are artificial intelligence algorithms used in machine learning. The method may separate two additive signals using two GANs models, wherein the output from one GAN is used as input for computing or calculating the loss in the second GAN, and conversely information or output from the second GAN is used as input for calculating the loss in the first GAN. The loss measures the performance of a model, where the loss increases as the predicted value diverges from the actual value, and vice verse (the loss decreases as the predicted value get closer to the actual value).

Figure 1:
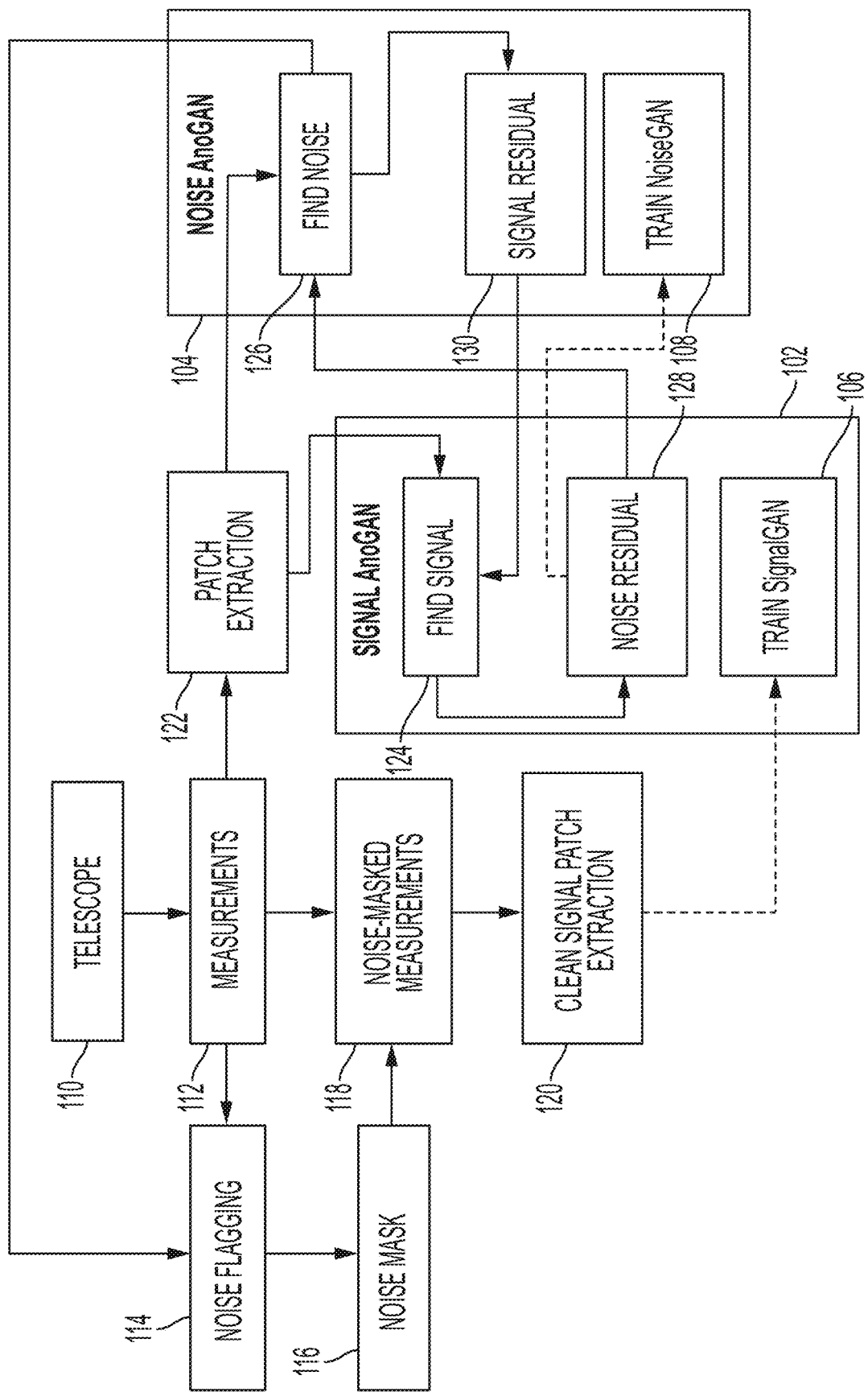
FIG. 1 is a diagram showing modules or components, which may generate the two generative adversarial networks (GANs), also referred to as "SignalGAN" and "NoiseGAN" models, in one embodiment.

FIG. 1 is a diagram showing modules or components, which may generate the GANs, also referred to as SignalGAN and NoiseGAN models, in one embodiment. In one aspect, multiple generative machine learning models may be built, each of which may correspond to a signal component. The names or identifiers of components (e.g., referred to with some upper case letters) shown in the figures are used for explanation purposes and the components should not be interpreted as being limited by their names or identifiers. Functionalities of the components may be implemented as software, firmware, or programmed hardware, or another, which can execute on one or more hardware processors.

A "Telescope" component 110 generates "Measurements" 112 of combined signal activity that are in a 2-dimensional (2D) matrix format to represent a spectrogram with time and signal frequency axes. A "Noise Flagging" component 114 receives as input the "Measurements" 112 and outputs "Noise Mask" 116, which for example, is a binary or floating point 2D matrix of the same size that indicates which regions of the input spectrogram contain significant noise signal component. In one embodiment, a trained "Noise AnoGAN" 104 can be used to perform the "Noise Flagging" 114 operation. A "Noise-Masked Measurements" component 118 applies the "Noise Mask" 116 to "Measurements" 112 by highlighting parts of the measurement spectrogram indicated by "Noise Mask" 116. The highlighting can be performed through contrasting coloring, for example, via a user interface. An example user-interface embodiment is shown and described with reference to FIG. 10. A "Clean Signal Patch Extraction" component 120, for instance, based on the highlighting, selects patches from the measurement spectrogram that do not contain significant noise signal (e.g., according to predefined or user-selected significance level) to assemble a collection of patches to train the "Signal AnoGAN" component 102. A "Patch Extraction" component 122 receives as input the "Measurements" 112 and selects fixed-size or variable-sized regions from the spectrogram to assemble a dataset to train the "Noise AnoGAN" component 104. For test phase the "Telescope" component 110 provides the "Measurements" 112 for the "Patch Extraction" component 122 where the combination of Signal AnoGAN component 102 and Noise AnoGAN component 104 as a "Dual AnoGAN" finds signal and noise. For instance a "Find signal" component 124 of the Signal AnoGAN 102 finds signals and a "Find noise" component 126 finds noise in a jointly optimized way.

Once the models are trained, SignalGAN trained at 106 and NoiseGAN trained at 108 are used as anomaly-GANs (also referred to as AnoGANs) 102, 104, each of which produces the most realistic source-specific version for a given potentially-mixed measurement. In one embodiment, the Dual-AnoGAN is proposed as a combination of and interaction between SignalGAN and NoiseGAN, utilizing source-residuals to refine the search of the signal and noise components, which is an iterative optimization process. For instance, noise residual 128 computed at signal AnoGAN 102 as a residual of the measurements 112 and signal found at 124 can be transmitted to the Noise AnoGAN 104's find noise component 126 in refining the finding of noise. Similarly, signal residual 130 computed as a residual of the measurements 112 and noise found at 126 can be transmitted to the Signal AnoGAN 102's find signal component 124 so that the find signal component 124 can refine signal finding further based on the signal residual 130.

Given input data which may include two additive signals and with access to ground-truth training data in the form of labels or masks for one of the components (e.g., signal of interest or unwanted noise), the method is further able to produce training data for the component for which ground-truth labels or masks are not available (e.g., noise or signal).

In another embodiment, a method may include obtaining measurement patch selection parameters from a user, e.g., via a graphical user interface (GUI). In one embodiment, the GUI may implement a visual guidance with a probabilistic heatmap of a signal source presence. The GUI may also be used to define the primary training data assembly from mixed measurement inputs.

Figure 2:
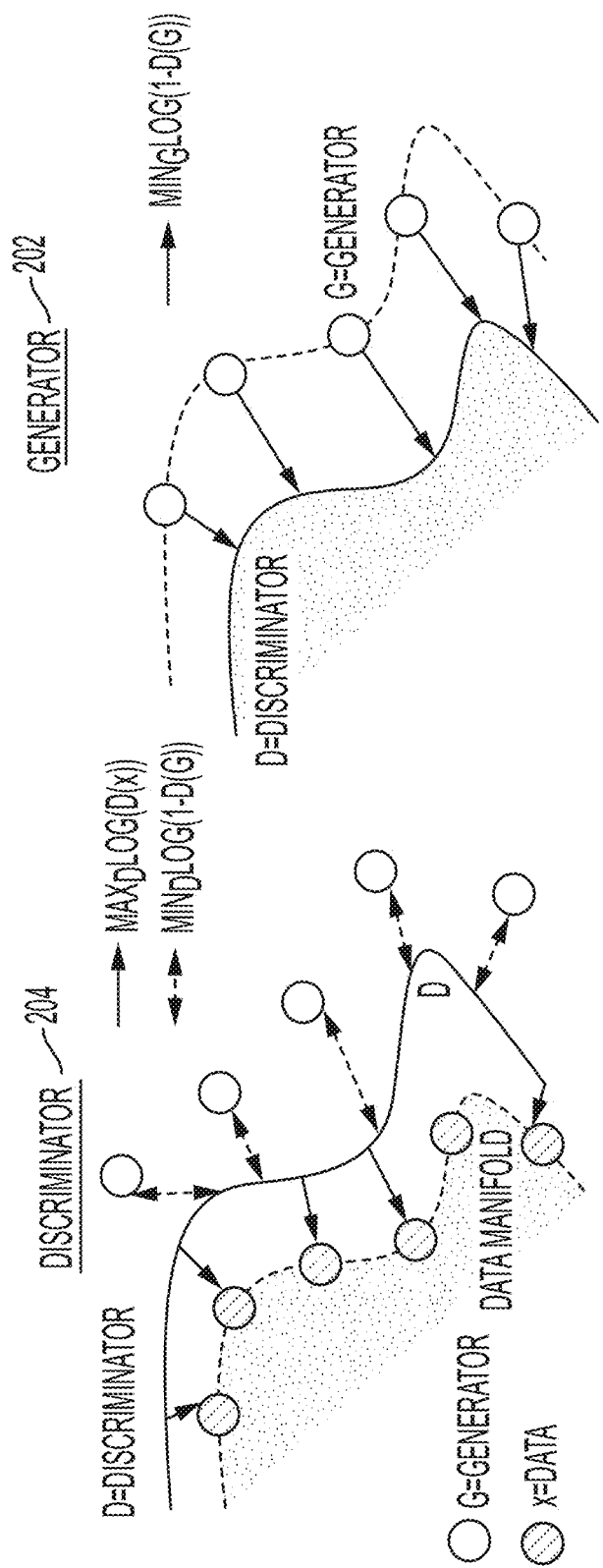
FIG. 2 shows generator and discriminator modules of a generative adversarial network (GAN) in one embodiment.

A method of generating generative adversarial network (GAN) models is described below in detail in one embodiment. In one embodiment, GANs include a generator and discriminator modules. FIG. 2 shows generator and discriminator modules of GANs in one embodiment. A function of the generator module 202 is to produce a realistic sample from a random number vector (e.g., Latent Sampler), e.g., producing samples that do occur on the data manifold. For instance, cross-entropy optimization may be implemented in which the generator minimizes the likelihood that the discriminator classifies the generator's output as being a generated signal (as opposed to a real signal), such that the generator generates signals closest to real ones. This optimization can be expressed as $\min_G \log(1-D(G))$, where $D(G)$ represents a classification output associated with the generated signal G.

The discriminator module 204 receives an input and produces a scalar, for example, between 0 (unrealistic) and 1 (realistic) that indicates how realistic the input looks (another value or range other than 0 and 1 may be employed). The discriminator module 204 considers data from two sources, namely: real data samples from an existing dataset and synthetic data samples produced by the generator 202. The synthetic data samples are labeled as synthetic. The discriminator module 204 may learn a decision boundary that distinguishes real data samples from synthetic data samples. During GAN training the generator module 202 learns a mapping from a low-dimensional latent space to the data manifold embedded in the higher dimensional data space, such that unrealistic samples will not likely occur on the data manifold. Data in latent space include latent feature of signals; data in data manifold include signals that are likely more realistic. In an example implementation, the latent space (low-dimensional) is defined in terms of a generator component noise or latent vector (e.g., FIG. 3, 318), from which the generated data (e.g., FIG. 3, 310) is determined. The data manifold is defined as the latent vectors that are associated with and produce realistic data (higher dimensional). Conversely, points not on the data manifold are those latent vectors that do not produce realistic data. The solid line shown at 204 indicates the trained discriminator data manifold, so the latent vectors corresponding to realistic data according to the discriminator, which should map to the real data points.

In one aspect, cross-entropy optimization may be implemented to train the discriminator to maximize the likelihood of correctly identifying signals, e.g., real from the generator generated signals.

Figure 6:
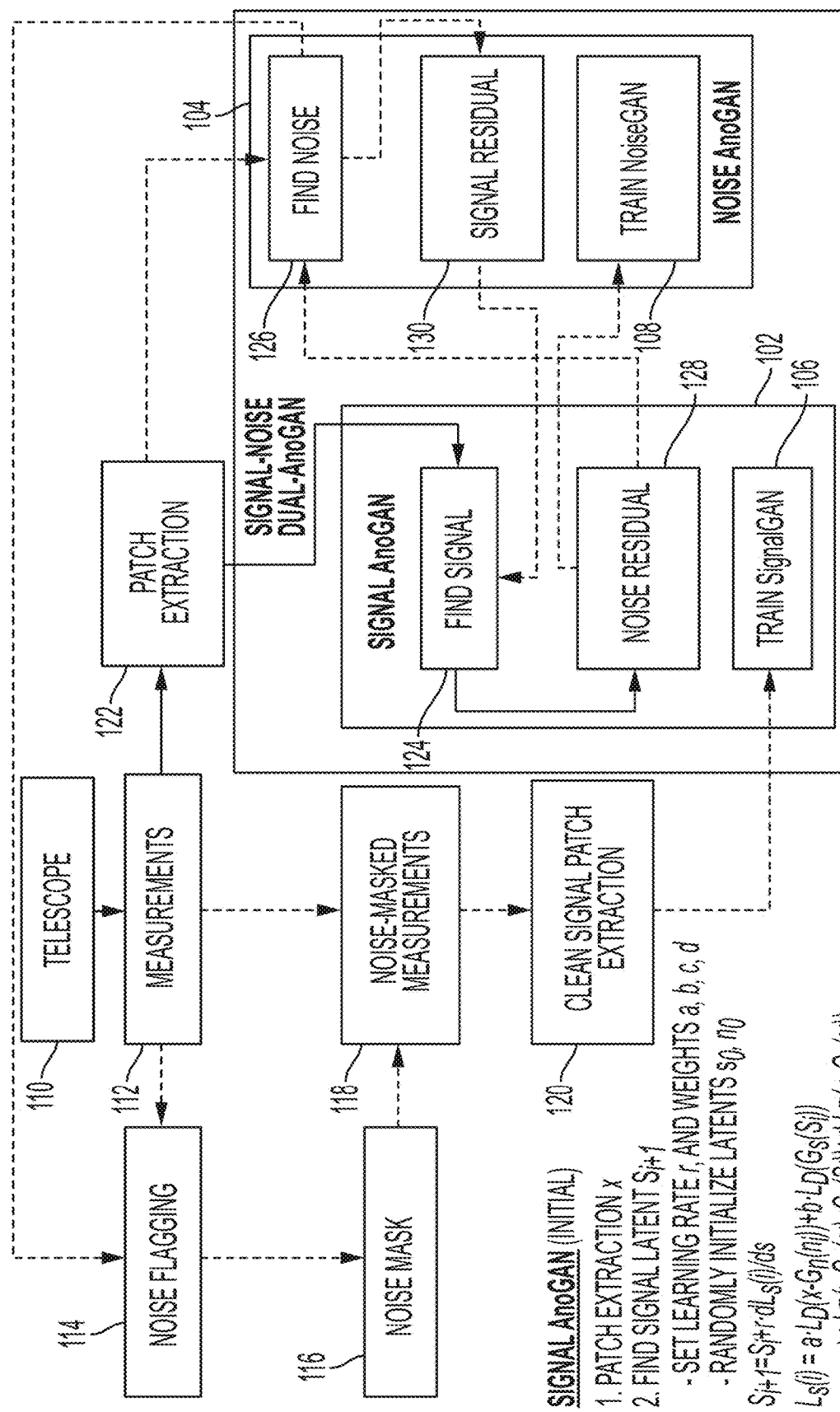
FIGS. 6, 7 and 8 show a Dual-AnoGAN, which includes an interaction between a Signal-AnoGAN and a Noise-AnoGAN in one embodiment.
Figure 7:
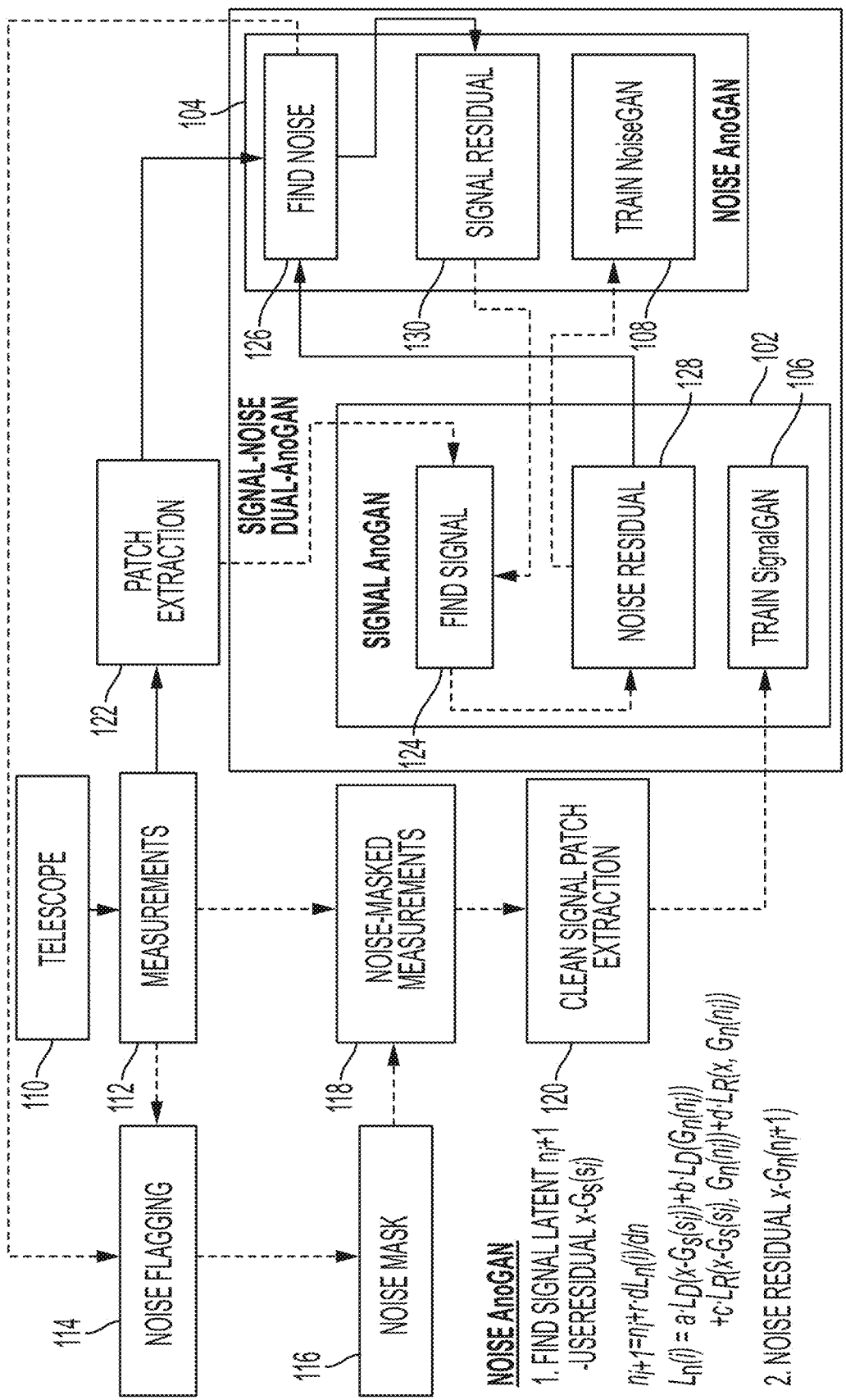
Figure 8:
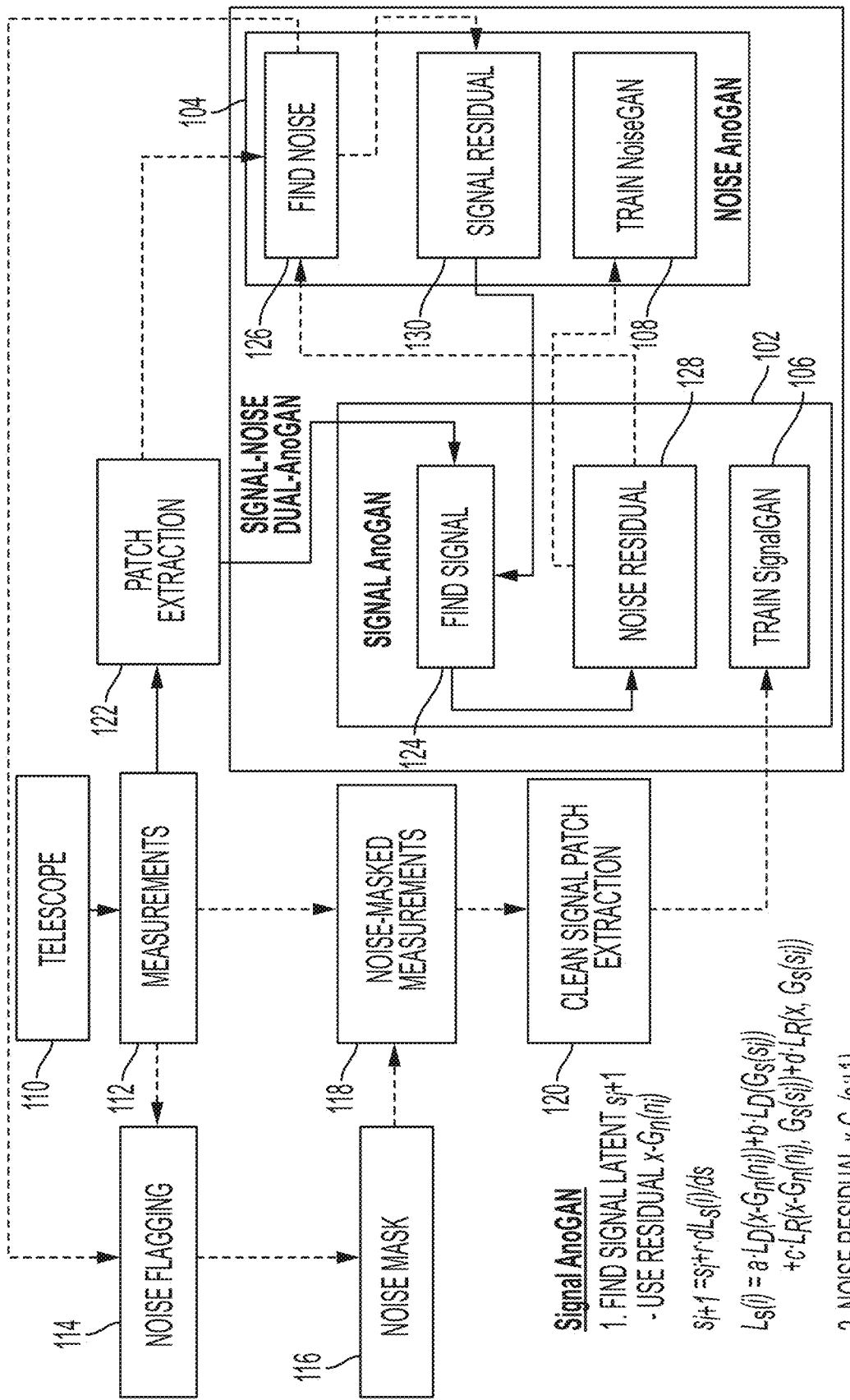

The combination of "Signal AnoGAN" 102 and "Noise AnoGAN" 104 separates signal from noise components in spectrogram patches provided by "Patch Extractor" 112. FIGS. 6, 7, and 8 detail an iterative procedure in one embodiment, which performs the "Dual AnoGAN" separation.

In one embodiment, the discriminator module 204 can be implemented as a convolutional neural network (CNN) with a binary regression output (e.g., 0 or 1). In another embodiment, the generator module 202 can be implemented as a series of convolutional neural layers and upsampling operations to progress from a latent vector to a sample output, for instance, a deep learning classifier in the reverse direction.

Figure 3:
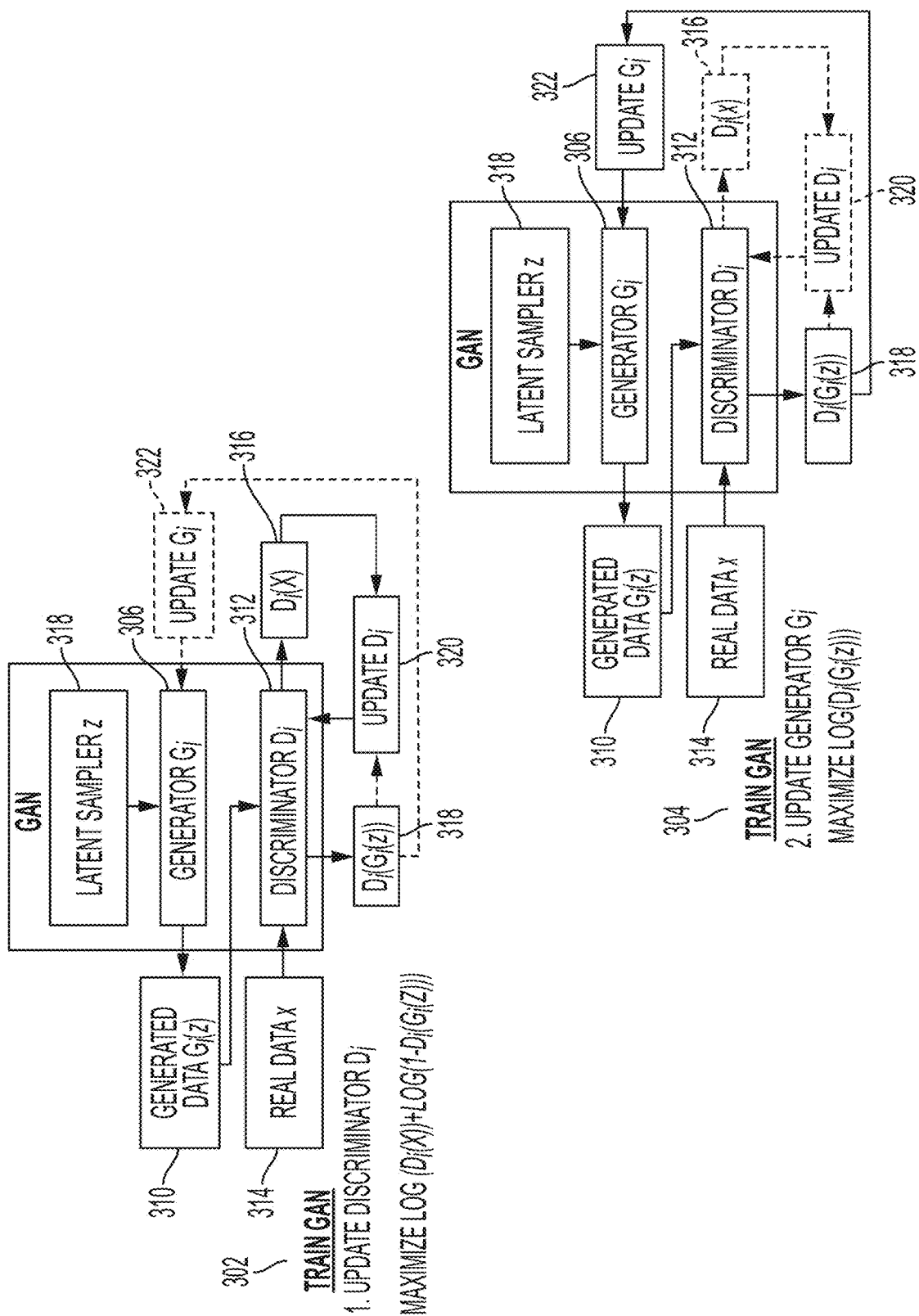
FIG. 3 is a diagram showing discriminator and generator updates for a GAN training step, in one embodiment.

FIG. 3 is a diagram showing discriminator and generator updates for a GAN training step, in one embodiment. In one embodiment, the GAN training process iteratively alternates between a discriminator training step 302 and a generator training step 304, until a user-defined stopping criterion (or another criterion) is satisfied, such as reaching a predefined number of training steps or if the loss change is less than a small value epsilon (a predefined threshold). A generator 306 receives data z sampled by a latent sampler 308 and generates signals G(z) 310 based on data z sampled by the latent sampler 308. A discriminator 312 receives the signals 310 generated by the generator 306 and real data signals x 314, and learns to distinguish between the real data x and generated data G(z), for example, outputs whether the data is real data 316 or generated data 318. The losses of the outputs 316, 318 are further used to update 320 the discriminator 312. For instance, the training maximizes $\log(D_i(x)+\log(1-D_i(G_i(z)))$, wherein $D_i(x)$ represents an output of the discriminator with respect to the real signals and $D_i(G_i(z))$ represents an output of the discriminator with respect to the generator generated signals. In the expression, i represents i-th training step. For the discriminator's training step 302, the weights of the generator 306 are kept fixed and the discriminator weights are updated such that the discriminator output for samples produced by the generator should regress to an unrealistic determination (0), while the discriminator output for real samples should regress to a realistic determination (1).

The generator update step 304 uses the existing discriminator (a prior trained model, e.g., in a previous step) 312 and maximizes toward a realistic determination over generated samples. The output of the discriminator 312 with respect to the data generated by the generator 318 is used to update 322 the generator to improve the generator (i.e., the generator learns to better generate closer to realistic signals).

A GAN can be used to identify anomalous data samples (and regions within the samples) that do not conform to the expected distribution and variation of normal data. In one embodiment of a method and/or system in the present disclosure, the method and/or system may identify and differentiate unwanted noise (or interference) from an underlying signal of interest using an anomaly GAN model. To achieve this, in one embodiment, a GAN is trained on each separate component of the training data, each of which learns a 'model' for its respective source-component. In one embodiment, the anomaly GAN model includes a signal model component (referred to as "Signal AnoGAN") and a noise model component (referred to as "Noise AnoGAN"). An input example for training the "Signal AnoGAN" 102 is a "Clean Signal Patch Extraction" 120 from the "Noise-Masked Measurements" 118 represented by a region of the measurement spectrogram where noise-flagged pixels can, e.g., be set according to the local statistics of the surrounding spectrogram area to represent effectively only the clean signal components. When given an input example at test phase, which include a mixture of both clean signal and noise components (without access to ground truth labels), the method and/or system then may run the anomaly GAN model to separate the different components. The method and/or system further uses the generator (e.g., of the "SignalGAN") to produce the most realistic clean signal component based on the input example. This input example during test phase is a "Patch Extraction" 122 of a "Measurement" 112 represented, e.g., by a spectrogram region. When a sufficiently realistic clean signal component is obtained (e.g., sufficiency determined based on a threshold or number of generator runs), the difference between this component and the input example may yield an estimate of the noise component. In the same way the noise-GAN can produce an estimate of what the clean signal should look like. Output from one anomaly-GAN can then be used as input to the other in order to further refine the optimization process. In some embodiments, there are two anomaly-GANs for two additive signal components, e.g., the "Signal AnoGAN" and "Noise AnoGAN", such that the residual from the one can estimate the other's output based on the combined signal being the sum of the two components.

In one embodiment, the "noise-GAN" or "NoiseGAN" is a component in the "Noise AnoGAN". Likewise, the "signal-GAN" or "SignalGAN" is a component in the "Signal AnoGAN". The trained "NoiseGAN" is used within the "Noise AnoGAN" to produce an estimate of the noise signal. The trained "SignalGAN" is used in the "Signal AnoGAN" to produce an estimate of the signal.

Figure 4:
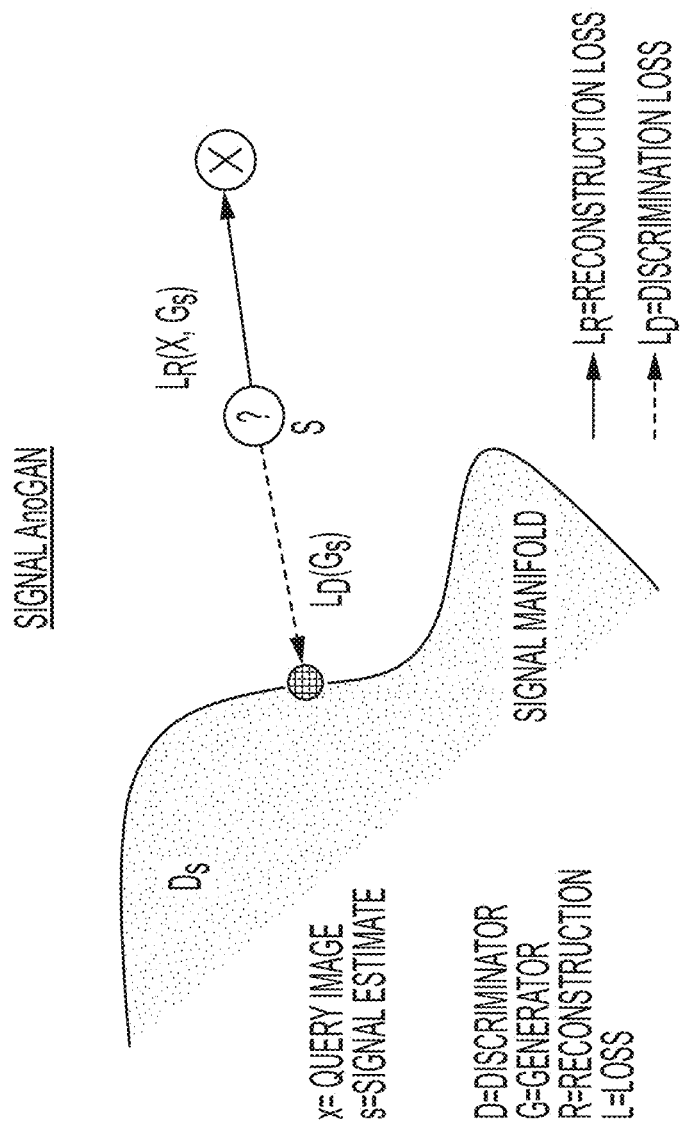
FIG. 4 shows an example of a given input and usage of the data manifold to find the closest real sample, using both the discriminator and generator trained on positive data, in one embodiment.

FIG. 4 shows an example of a given input and usage of the data manifold to find the closest real sample, using both the discriminator and generator trained on positive data, in one embodiment. For instance, an operation of an anomaly-GAN ("anoGAN" or "AnoGAN") is shown in determining the likely counterpart for a noisy measurement. By finding the closest realistic sample to a given input, and assuming an additive mixture between realistic and anomalous features, both a clean realistic sample and a clean anomaly extraction can be obtained. In this example, two losses are used in the AnoGAN, a discrimination loss $L_D$ and a reconstruction loss $L_R$, and the sum of these two losses are minimized by iteratively refining the signal estimate S by optimizing its corresponding latent vector z (e.g., shown in FIG. 3 at 318) until a stopping criterion is reached such as the iterative update being smaller than a defined small epsilon.

"Dual-AnoGAN", for example, comprising a signal AnoGAN and a noise AnoGAN is described below in one embodiment. For data including an additive mixture between two sources, knowledge of any one of the constituent sources can be used for a given mixture to produce the other contributing source components through subtraction, e.g. (mixture−signal)=noise.

Figure 5:
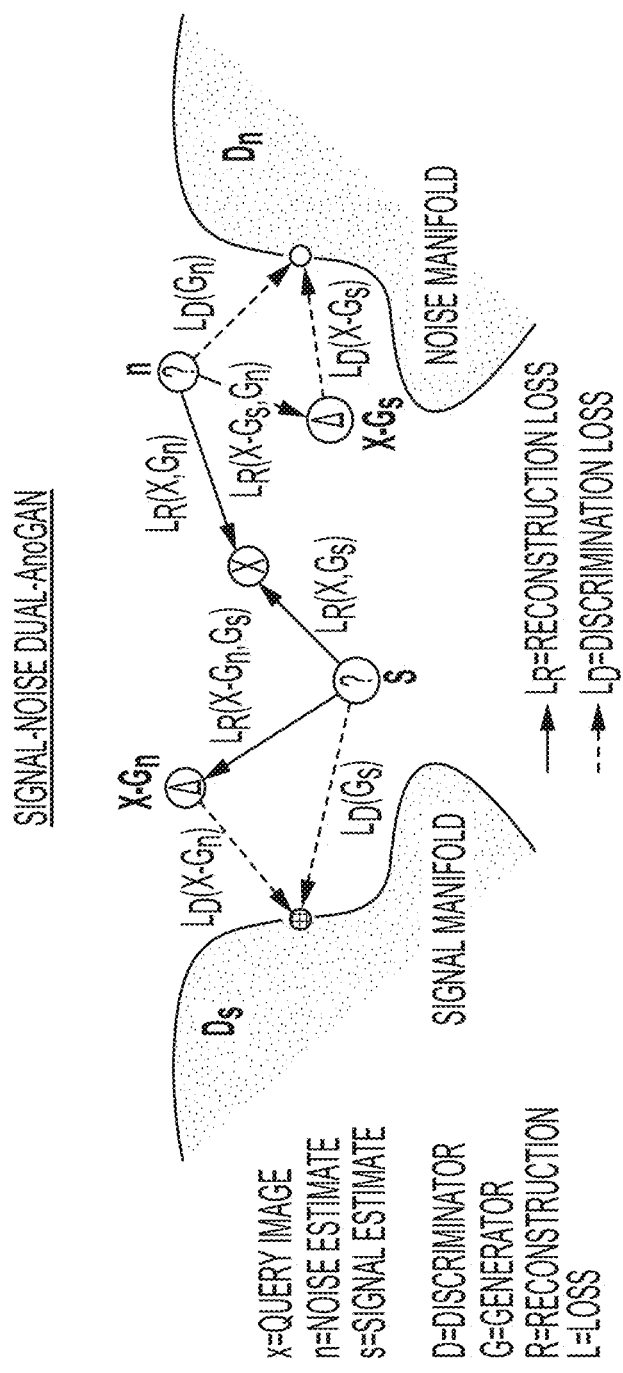
FIG. 5 illustrates an example dual model (referred to as "Dual-AnoGAN") in determining the two likely components given a mixed measurement, in one embodiment.

FIG. 5 illustrates an example dual-AnoGAN in determining the two likely components given a mixed measurement, in one embodiment. In the AnoGAN search for a realistic representation of a particular constituent source, the residual obtained from a similar search for the other constituent source can be used to refine and accelerate the search, and vice versa. For instance, in one embodiment, where data includes signal-noise mixtures, the determination of the Noise GAN of what the signal components should be can be obtained as the signal residual of a Noise-AnoGAN. Likewise, the Signal-AnoGAN can produce a determination on the noise component. In this example, estimate n is optimized by the Noise-AnoGAN and estimate s is optimized by the Signal-AnoGAN, with each of these optimizations using three losses each: e.g., for the Noise-AnoGAN a discrimination loss between the estimate n and the corresponding data manifold $D_n$, a discrimination loss between the residual $x−G_n$ and the signal manifold $D_s$, and a reconstruction loss between the mixed input and the noise estimate.

In one embodiment, the curation of training datasets for both components can be arranged by single-source binary masking of mixture samples, for instance, given that there are sufficient unmasked patches indicating positive examples of clean samples for the other source. This can be used to train the first GAN, e.g., the SignalGAN, which can then be used as Signal-AnoGAN where the residuals can be used as training dataset for the Noise-GAN. The residuals refer to the difference in signals between the mixture samples and identified clean samples. Single-source binary masking of the "Measurements", in the case of the noise-source, corresponds to "Noise Flagging" in FIG. 1, where the pixels of the spectrogram representation that have a significant level of noise (significance determined based on a selected or predefined threshold value), e.g., are set to 1 in a binary mask. In this case, sufficient unmasked patches of the signal source are performed in "Clean Signal Patch Extraction". The signal residual is the mixture sample minus the clean noise estimate, and the noise residual is the mixture sample minus the clean signal estimate.

FIGS. 6, 7 and 8 show a Dual-AnoGAN, which includes an interaction between a Signal-AnoGAN and a Noise-AnoGAN in one embodiment. FIG. 6 shows an initial search update step for the Dual-AnoGAN is shown. The Signal-AnoGAN and the Noise-AnoGAN's residuals are utilized in an expanded AnoGAN loss function that also incorporates the reconstruction between a search candidate and the respective residual and the discrimination of that residual. The expected dynamic is for the Noise-AnoGAN to consider whether its signal residual is realistic, and not just its noise candidate. Similarly, the Signal-AnoGAN considers whether its signal residual is realistic, and not just its signal candidate.

The residual in the beginning of the Dual-AnoGAN search may be expected to be inaccurate, so a learning rate schedule can be set for the residual loss components to de-emphasize the residual losses at the start. In particular, for example, the residual losses refer to $L_D(x−G_n)$ and $L_R(x−G_n, G_s)$ in the case of the noise residual, and also $L_D(x−G_s)$ and $L_R(x−G_s, G_n)$ in the case of the signal residual. In one embodiment, there is a back-and-forth training iteration update first for the Signal-AnoGAN and then for the Noise-AnoGAN, to provide a balanced opportunity for dual optimization and refinement.

FIG. 6 shows steps the Signal-AnoGAN 124 may perform to initially find a signal. For instance, the "Patch Extraction" component 122 produces a set of patches taken as regions from a "Measurement" spectrogram 112, which is input to the Dual-AnoGAN 102, 104. In the next step, for example, "Find signal" component 124 finds the next latent vector for the clean signal estimate, starting from the first estimate with a randomly initialized latent vector. A further step produces the noise residual 128 from the difference of the mixed input sample and the latest clean signal estimate.

FIG. 7 shows a second update for the Dual-AnoGAN search process in one embodiment. The desired output of the Dual-AnoGAN is a signal and noise estimate that most conforms to both the learned signal and noise manifolds. For instance, provided that the training data for the SignalGAN and NoiseGAN are sufficiently representative, and given a query input which includes an additive mixture between signals and noise, the Dual-AnoGAN search is expected to find an equilibrium. For example, the equilibrium occurs when there is a small update difference (e.g., predefined threshold difference) in the signal and noise estimates, meaning that the difference between the latest two consecutive estimates is smaller than a small epsilon (predefined threshold) for both the signal and the noise estimate. The learning rate schedules can be varied dynamically to promote convergence for non-conforming mixtures, e.g., to de-emphasize the residual-sharing in the optimization process. Gradient descent optimization can be used in one embodiment.

Shown in FIG. 7, the "Find noise" component 126 finds the latest estimate of the latent vector of the noise estimate and the corresponding output sample using gradient descent with the combination of the discrimination and reconstruction losses that are discriminatively scaled with coefficients, each with their own learning rate/schedule. The signal residual 130 between the mixed input sample and the noise estimate are also calculated.

FIG. 8 shows a Signal AnoGAN update step for Dual-AnoGAN in one embodiment. Shown in FIG. 8, the next iteration of the Dual-AnoGAN search is continued, after the first iteration which includes the Signal AnoGAN (FIG. 6) and Noise AnoGAN (FIG. 7) steps where the signal and noise estimates were initialized. In one embodiment, every iteration contains the Signal AnoGAN and Noise AnoGAN search updates, where the signal and noise estimates and the signal and noise residuals are correspondingly updated to refine the search.

Figure 9:
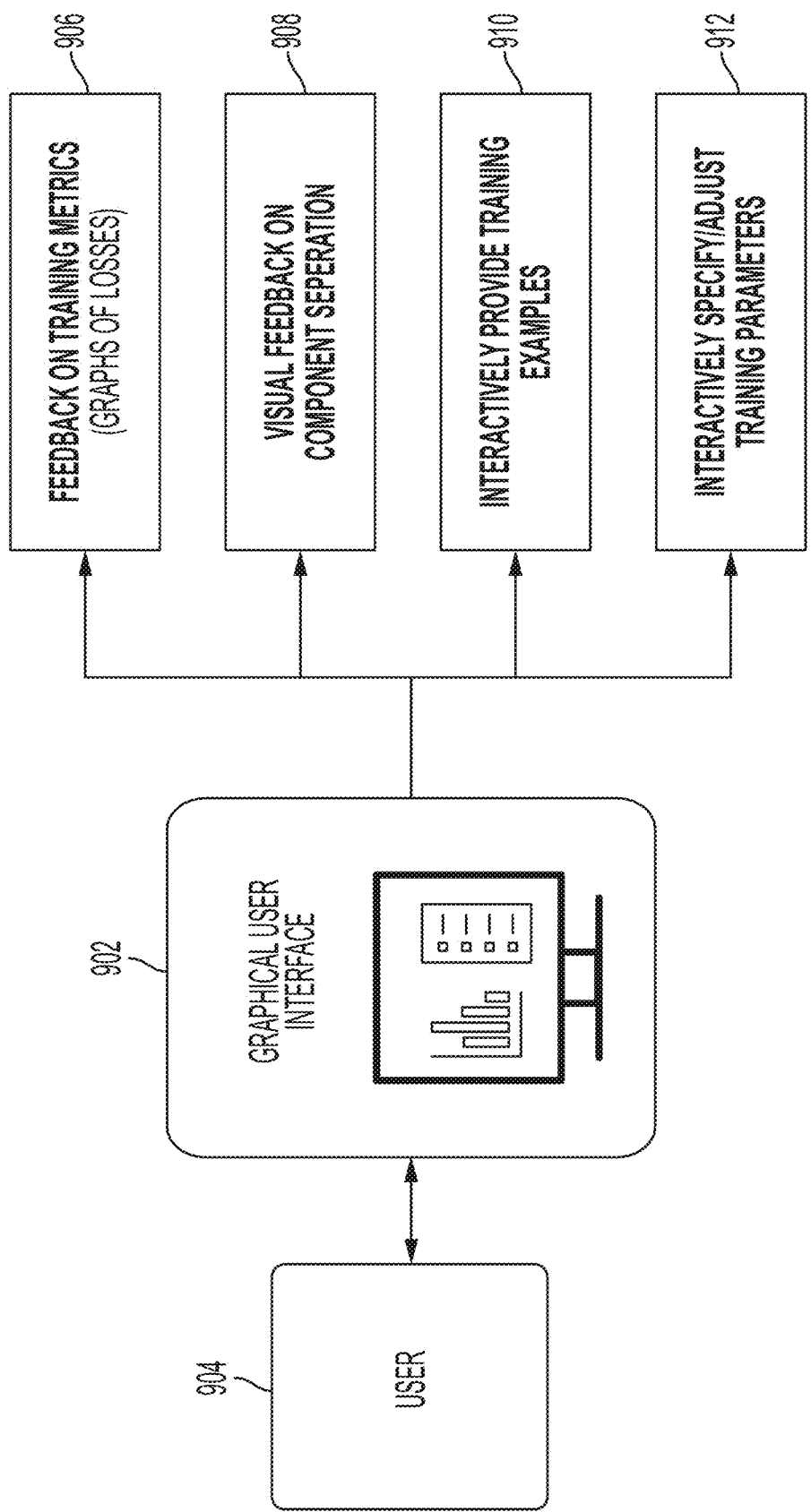
FIG. 9 is a diagram showing a user interface in one embodiment.
Figure 10:
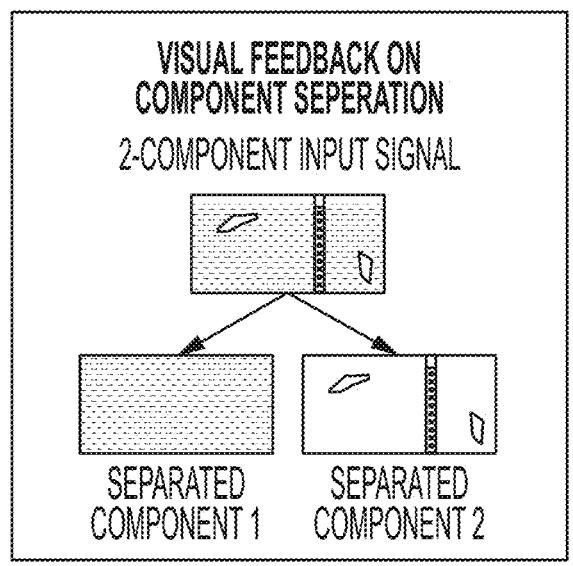
FIG. 10 illustrates an example visual feedback on component separation in one embodiment.

FIG. 9 is a diagram showing a user interface in one embodiment. A graphical user interface (GUI) 902 can serve as a way to interact with a Dual-AnoGAN system in one embodiment. For instance, the GUI 902 can provide feedback on training metrics and performance, for instance, to a user 904. As training progresses, the user 904 can interactively monitor graphs of the discriminator and reconstruction losses associated with each AnoGAN model. For instance, the GUI can provide feedback on training metric, which may include graphs of losses 906. The GUI 902 can also provide an interface that gives visual feedback on component separation 908 to the user 904 and allows the user 904 to view images of the input signal (e.g., of the two additive components), and the separation achieved for each component by the Dual-AnoGAN system at test phase. FIG. 10 illustrates an example visual feedback on component separation in one embodiment.

Figure 11:
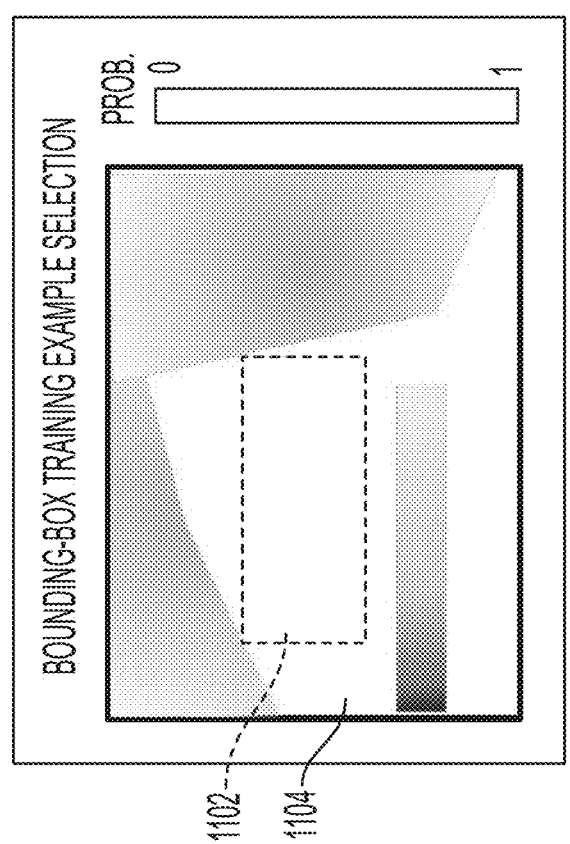
FIG. 11 shows a bounding box training example selection in one embodiment.

The GUI 902 can also allow the user to interactively select or provide examples of training data as shown at 910, for example, using a bounding box. Since ground truth labels for one of the two additive components (noise for example) are available, a heat-map or histogram can be calculated over all the training examples, which reflects the probability of each pixel containing noise. With such a histogram, the user can be given the ability to select a bounding-box region within the heatmap that contains as little noise as possible. Regions specified by this bounding box can then be collected across all training examples which may then serve as the new set of training data. FIG. 11 shows a bounding box training example selection in one embodiment. In some embodiments, the "Measurements" (e.g., shown in FIG. 1, 112) are represented by 2D matrices that are spectrograms indicating the signal frequency content over time, and a bounding box 1102 of the spectrogram is a submatrix within that spectrogram 1104 as delineated through two 2D coordinates being, e.g., the upper left and lower right corners selected in GUI 902. In some embodiments, the submatrix bounding box in every spectrogram in a set of spectrograms in the "Measurements" can be collectively used as training data for a clean signal component, which then includes a set of same-sized smaller spectrograms derived from the original "Measurements" according to the bounding box.

The GUI 902 can allow provide a functionality to interactively specify and/or adjust training parameters 912. For example, via the GUI 902, a preference selection for prioritizing AnoGAN accuracy can be made by the user 104 on a linear scale, with a default of equal priority between the Signal-AnoGAN and Noise-AnoGAN. If the user 904 selects greater preference for the Signal-AnoGAN, then the Noise-AnoGAN learning rates associated with the signal residual can be multiplied with an emphasizing factor that ranges from 1.0 to e.g. 1.5 where a 50% increase in the prioritization of the signal residual is set if the Signal-AnoGAN is completely prioritized. In one aspect, the learning rates are normalized after multiplication with the specific emphasizing factors. Similarly, if the Noise-AnoGAN is prioritized, then the noise residual learning rates in the Signal-AnoGAN are increased. In this way, the targeted accuracy for a user-specified source can be increased, where that source receives higher learning priority in the Dual-AnoGAN search process.

Figure 12:
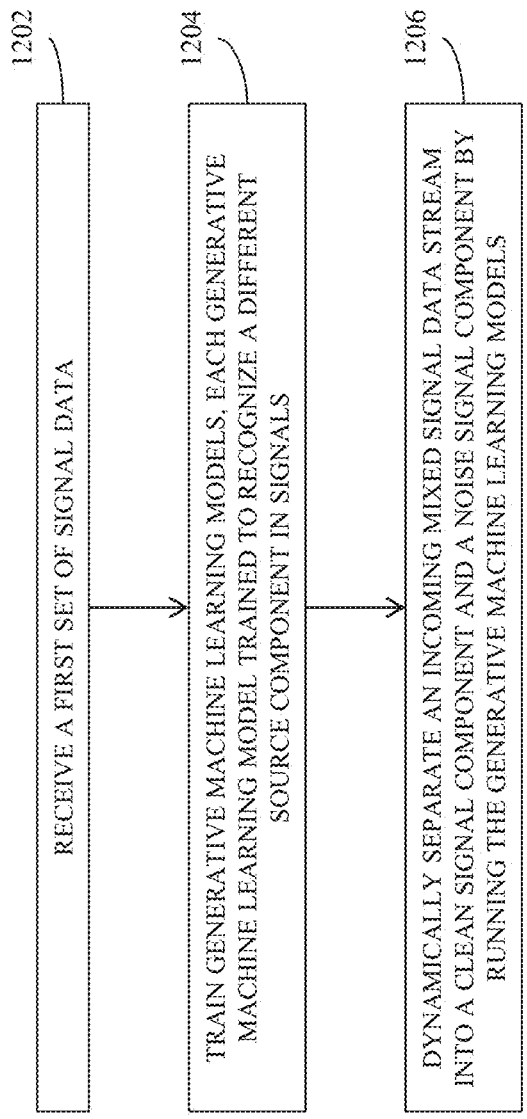
FIG. 12 is a diagram showing a method of separating additive signals in one embodiment.

FIG. 12 is a diagram illustrating a method of separating additive signals with mixed measurements in one embodiment. Mixed signal data, for instance, contains at least one component from either signal or noise, but generally both signal and noise components occur within every incoming data stream where the task is to separate these components.

At 1202, a first set of signal data is received. In one aspect, the first set of signal data may include a continuous stream of time-frequency measurements data received, for example, from a radio telescope dish. The first set of signal data may include mixed measurements, for example, pure or clean signals and noise or interference signals.

At 1204, generative machine learning models are trained based on the first set of signal data. In one aspect, the generative machine learning models include at least a first model trained to identify a first signal component and a second model trained to identify a second signal component. The first and second signal components are different components of signals, for example, one pure signal and the other noise signal. In one aspect, the first model is trained to extract the first second signal component and the second signal component, and the second model is trained based on the extracted second signal component. In one aspect, each of the generative machine learning models may include a discriminator model and a generator model, the generator model generating signal data as a further training data set to train the generative machine learning models.

At 1206, an incoming mixed signal data stream may be dynamically separated into a clean signal component and a noise signal component by running the generative machine learning models. In one aspect, the incoming mixed signal data stream may include radio frequencies emitted from a celestial object. In one aspect, the trained generative machine learning models search for separated signal components, share search information between the trained generative machine learning models, and jointly optimize multiple search processes.

In one aspect, the method includes characterizing signals of interest (e.g., also referred to as pure or clean signal) and noise or interference by analyzing the first set of signal data. This analysis, for example, can include the training and use of the Signal AnoGAN and Noise AnoGAN in the Dual-AnoGAN. The analysis, for instance, includes a set of training, search and optimization operations. A method of separating signal sources, in one aspect, may be optimized by utilizing the trained generative machine learning models to search for separated signal components, sharing search information between the trained generative machine learning models and jointly optimizing multiple search processes that utilize the trained generative machine learning models. In one aspect, training data pertaining to separate signal sources are generated for multiple generative machine learning models.

In one aspect, the method may include receiving mixed measurements with accompanying flagging of one of the signal components, training a generative machine learning model on measurement parts that do not contain other signal components as indicated by the available flagging, utilizing the trained generative machine learning model to extract the corresponding pure signal component and the other signal components under the additive assumption, and utilizing the other signal components to train another of the generative machine learning models. In one aspect, the generative machine learning models may be optimized and refined based on user specified input (e.g., training metrics and performance) via a graphical user interface (GUI).

In one aspect, a method of separating signal sources may be optimized by utilizing the trained generative machine learning models to search for separate signal components; calculating a residual for the other source given a trained model to obtain two residuals, one for each source; sharing the residuals and search information between the trained generative machine learning models; calculating reconstruction and discrimination losses for both source extractions given the mixed input and model-conformant version points on a manifold; calculating the reconstruction and discrimination losses for the shared residuals given the source extraction and model-conformant version points on the manifold; adjusting loss-wise learning rates to increase contributions from the shared residual losses over time; iterating between the two source search processes, recalculating and sharing the residuals after every iteration; terminating the search when the losses change by less than a defined threshold value in one iteration; and jointly optimizing multiple search processes that utilize the trained generative machine learning models.

Figure 13:
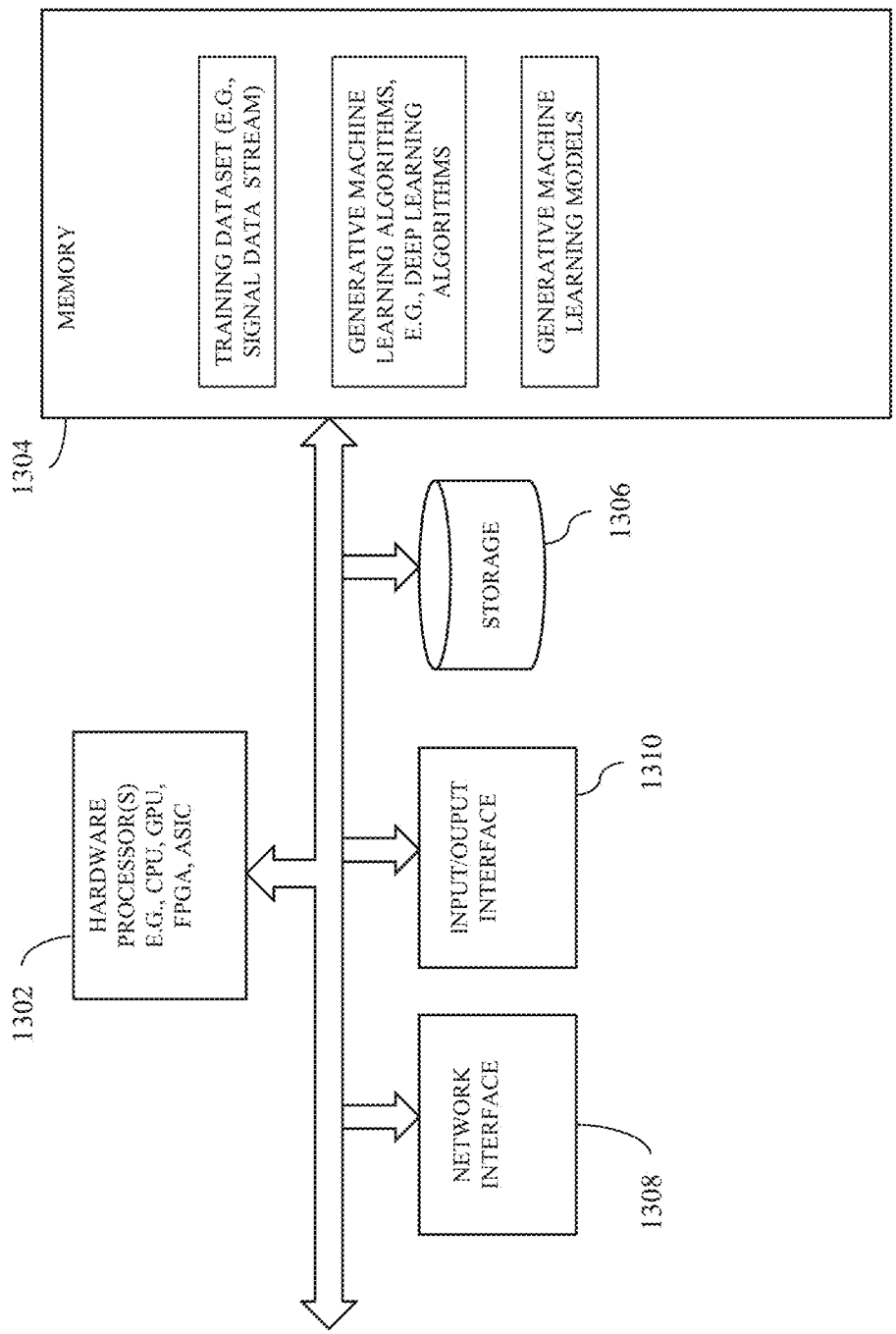
FIG. 13 is a diagram showing computer components which may separate additive signals in one embodiment.

FIG. 13 is a diagram showing components of a system in one embodiment that separates additive signal mixtures. One or more hardware processors 1302 such as a central processing unit (CPU), a graphic process unit (GPU), and/or a Field Programmable Gate Array (FPGA), an application specific integrated circuit (ASIC), and/or another processor, may be coupled with a memory device 1304, and build/train generative machine learning models and separate mixed signals into components. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium. The memory device 1304 may, for example, store instructions and/or data for functioning of the one or more hardware processors 1302, and may include an operating system and other program of instructions and/or data. The one or more hardware processors 1302 may receive input comprising training data set with which to train a generative machine learning model. For instance, at least one hardware processor 1302 may generate generative machine learning models which can separate signal components from incoming signals with mixed components, for example, using generative adversarial networks techniques and/or other artificial intelligence techniques. In one aspect, the training data set may be stored in a storage device 1306 or received via a network interface 1308 from a remote device, and may be temporarily loaded into the memory device 1304 for building or generating the models. The trained generative machine learning models may be stored on memory 1304, for example, for execution by one or more hardware processors 1302. The one or more hardware processors 1302 may be coupled with interface devices such as a network interface 1308 for communicating with remote systems, for example, via a network, and an input/output interface 1310 for communicating with input and/or output devices such as a keyboard, mouse, display, and/or others.

The methodology of the present disclosure, for example, can identify signal components of radio frequency emission. Such functionality, for example, can identify malfunctioning equipment or malicious users on communication bands, monitor unauthorized activity on restricted frequencies, e.g., by regulatory bodies, or identify RFI in time-frequency spectrogram measurements from astronomical radio telescopes. Such functionality, can also detect anomalies in narrow/broadband emission of frequency modulation (FM), Long-Term Evolution (LTE) and Global System for Mobile communications (GSM) bands. This functionality can also mitigate noise/interference in communications with microsatellites that are put into orbit to supply global internet.

FIG. 14 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 14 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of separating additive signals with mixed measurements, comprising:
   receiving a first set of signal data;
   training generative machine learning models based on the first set of signal data, the generative machine learning models comprising at least a first model trained to identify a first signal component and a second model trained to identify a second signal component; and
   dynamically separating an incoming mixed signal data stream into a clean signal component and a noise signal component by running the generative machine learning models,
   wherein the trained generative machine learning models search for separated signal components, share search information between the trained generative machine learning models, and jointly optimize multiple search processes, and
   wherein the first model is trained to extract the first signal component, wherein a residual is computed based on the extracted first signal component, and wherein the second model's training to extract the second signal component is further refined based on the residual.

2. The method of claim 1, wherein the incoming mixed signal data stream comprises radio frequencies emitted from a celestial object.

3. The method of claim 1, wherein the first set of signal data comprises a continuous stream of time-frequency measurements data received from a radio telescope dish.

4. The method of claim 1, wherein each of the generative machine learning models comprises a discriminator model and a generator model, the generator model generating signal data as further training data set to train the generative machine learning models.

5. The method of claim 1, wherein the second model is also trained to compute a signal residual based on the extracted second signal component.

6. The method of claim 5, wherein the first model's training to extract the first signal component is further refined based at least on the computed signal residual.

7. The method of claim 1, further including generating feedback including at least training metrics and performance associated with the generative machine learning models.

8. The method of claim 1, wherein a training parameter for training the generative machine learning models includes an accuracy rate between the first model and the second model.

9. The method of claim 1, wherein the accuracy rate is interactively configurable.

10. A computer program product comprising a computer readable storage medium having program instructions embodied therewith, the program instructions executable by a device to cause the device to:
    receive a first set of signal data;
    train generative machine learning models based on the first set of signal data, the generative machine learning models comprising at least a first model trained to identify a first signal component and a second model trained to identify a second signal component; and
    dynamically separate an incoming mixed signal data stream into a clean signal component and a noise signal component by running the generative machine learning models,
    wherein the trained generative machine learning models search for separated signal components, share search information between the trained generative machine learning models, and jointly optimize multiple search processes, and
    wherein the first model is trained to extract the first signal component, wherein a residual is computed based on the extracted first signal component, and wherein the second model's training to extract the second signal component is further refined based on the residual.

11. The computer program product of claim 10, wherein the incoming mixed signal data stream comprises radio frequencies emitted from a celestial object.

12. The computer program product of claim 10, wherein the first set of signal data comprises a continuous stream of time-frequency measurements data received from a radio telescope dish.

13. The computer program product of claim 10, wherein each of the generative machine learning models comprises a discriminator model and a generator model, the generator model generating signal data as further training data set to train the generative machine learning models.

14. The computer program product of claim 10, wherein the second model is also trained to compute a signal residual based on the extracted second signal component.

15. The computer program product of claim 14, wherein the first model's training to extract the first signal component is further refined at least based on the computed signal residual.

16. A system comprising:
    at least one hardware processor coupled with a memory device, the at least one hardware processor operable to at least:
    receive a first set of signal data;
    train generative machine learning models based on the first set of signal data, the generative machine learning models comprising at least a first model trained to identify a first signal component and a second model trained to identify a second signal component; and dynamically separate an incoming mixed signal data stream into a clean signal component and a noise signal component by running the generative machine learning models, wherein the trained generative machine learning models search for separated signal components, share search information between the trained generative machine learning models, and jointly optimize multiple search processes, and wherein the first model is trained to extract the first signal component, wherein a residual is computed based on the extracted first signal component, and wherein the second model's training to extract the second signal component is further refined based on the residual.

17. The system of claim 16, wherein the incoming mixed signal data stream comprises radio frequencies emitted from a celestial object.

18. The system of claim 16, wherein the first set of signal data comprises a continuous stream of time-frequency measurements data received from a radio telescope dish.

19. The system of claim 16, wherein each of the generative machine learning models comprises a discriminator model and a generator model, the generator model generating signal data as further training data set to train the generative machine learning models.

20. The system of claim 16, wherein the second model is also trained to compute a signal residual based on the extracted second signal component.

\* \* \* \* \*